United States Patent
Yan

(10) Patent No.: US 9,077,476 B2
(45) Date of Patent: Jul. 7, 2015

(54) SELF-CHARACTERIZATION TUNABLE OPTICAL RECEIVER

(71) Applicant: Futurewei Technologies, Inc., Plano, TX (US)

(72) Inventor: Xuejin Yan, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 36 days.

(21) Appl. No.: 14/049,274

(22) Filed: Oct. 9, 2013

(65) Prior Publication Data

US 2014/0099105 A1    Apr. 10, 2014

Related U.S. Application Data

(60) Provisional application No. 61/711,380, filed on Oct. 9, 2012.

(51) Int. Cl.
| | |
|---|---|
| H04B 10/079 | (2013.01) |
| H04B 10/67 | (2013.01) |
| H04J 14/02 | (2006.01) |

(52) U.S. Cl.
CPC ...... *H04J 14/0221* (2013.01); *H04B 10/07955* (2013.01); *H04B 10/0799* (2013.01); *H04B 10/675* (2013.01)

(58) Field of Classification Search
CPC .. H04B 10/07; H04B 10/079; H04B 10/0795; H04B 10/7957; H04B 10/07955; H04B 10/0799; H04B 10/12; H04B 10/25; H04B 10/272; H04B 10/60; H04B 10/671; H04B 10/675; H04B 10/69; H04B 10/691; H04J 14/023; H04J 14/0239; H04J 14/0242; H04J 14/0245; H04J 14/23
See application file for complete search history.

(56) References Cited

U.S. PATENT DOCUMENTS

| | | | | |
|---|---|---|---|---|
| 6,043,922 | A | | 3/2000 | Koga et al. |
| 6,140,920 | A | * | 10/2000 | Roberts .......................... 340/514 |
| 6,321,011 | B2 | * | 11/2001 | Deacon ........................... 385/50 |

(Continued)

FOREIGN PATENT DOCUMENTS

| | | |
|---|---|---|
| EP | 0577036 A1 | 1/1994 |
| WO | 03055107 A2 | 7/2003 |

OTHER PUBLICATIONS

Foreign Communication From a Counterpart Application, PCT Application No. PCT/US2013/063967, International Search Report dated Jan. 22, 2014, 5 pages.

(Continued)

*Primary Examiner* — Darren E Wolf
(74) *Attorney, Agent, or Firm* — Conley Rose, P.C.; Grant Rodolph; Jonathan K. Polk

(57) ABSTRACT

A self-characterization optical receiver comprising a tunable filter comprising a first transmission peak and configured to receive an optical signal comprising a plurality of channels at different wavelengths and output one channel at a wavelength corresponding to the first transmission peak, an optical-to-electrical (OE) converter configured to convert the one channel optical signal into an electrical signal, a monitor unit configured to adjust at least one control parameter based upon a power level of the electrical signal, and a control unit configured to adjust a heater bias current based upon control parameters received from the monitor unit, and wherein adjusting the heater bias current shifts the wavelength corresponding to the first transmission peak.

25 Claims, 12 Drawing Sheets

(56) References Cited

U.S. PATENT DOCUMENTS

| | | |
|---|---|---|
| 6,954,590 B2 * | 10/2005 | Kandpal et al. .................. 398/31 |
| 2006/0018660 A1 * | 1/2006 | Tian et al. ........................ 398/85 |
| 2006/0115271 A1 * | 6/2006 | Hwang et al. .................... 398/72 |
| 2008/0205887 A1 | 8/2008 | Murano et al. |
| 2009/0080882 A1 | 3/2009 | Cahill |
| 2009/0274457 A1 | 11/2009 | Cahill |
| 2011/0222867 A1 | 9/2011 | Dietz et al. |
| 2011/0299166 A1 | 12/2011 | Sun |

OTHER PUBLICATIONS

Foreign Communication From a Counterpart Application, PCT Application No. PCT/US2013/063967, Written Opinion dated Jan. 22, 2014, 6 pages.

Cahill, et al., "Tunable Thin Film Filters for Intelligent WDM Networks," Proc. SPIE vol. 6286, 'Advances in Thin Film Coatings for Optical Applications III,' Ed. M. J. Ellison, Aug. 2006, 10 pages.

Domash, "Tunable and Switchable Multiple-Cavity Thin Film Filters," Journal of Lightwave Technology, vol. 22, No. 1, Jan. 2004, pp. 126-135.

* cited by examiner

SELF-CHARACTERIZATION TUNABLE OPTICAL RECEIVER

CROSS-REFERENCE TO RELATED APPLICATIONS

The present application claims priority to U.S. Provisional Patent Application No. 61/711,380 filed Oct. 9, 2012 by Xuejin Yan and entitled "Novel Tunable Optical Receiver," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." A PON is a point-to-multipoint network comprised of an optical line terminal (OLT) at a central office (CO), a plurality of optical network units (ONUs) at the user premises, and an optical distribution network (ODN) connecting the OLT and the ONUs. PONs may also comprise remote nodes (RNs) located between the OLTs and the ONUs, for example, at the end of a road where multiple users reside. In recent years, time division multiplexing (TDM) PONs and wavelength division multiplexing (WDM) PONs have been deployed in order to increase bandwidth. In TDM PONs, each ONU may send and receive data across every available wavelength, but only at dedicated time intervals. In WDM PONs, each ONU may send and receive data in a continuous manner, but only at dedicated wavelengths. A hybrid PON combining TDM with WDM can support higher capacity so that an increased number of users can be served by a single OLT with sufficient bandwidth per user. In such a time and wavelength division multiplexed (TWDM) PON, a WDM PON may be overlaid on top of a TDM PON. In other words, multiple wavelengths may be multiplexed together to share a single feeder fiber, and each wavelength may be shared by multiple users using TDM. TWDM PONs, however, present design and cost issues that must be addressed.

SUMMARY

In one embodiment, the disclosure includes a self-characterization optical receiver comprising a tunable filter comprising a first transmission peak and configured to receive an optical signal comprising a plurality of channels at different wavelengths and output one channel at a wavelength corresponding to the first transmission peak, an optical-to-electrical (OE) converter coupled to the tunable filter configured to convert the one channel optical signal into an electrical signal, a monitor unit coupled to the OE and configured to adjust at least one control parameter based upon a power level of the electrical signal, and a control unit coupled to the monitor unit and the tunable filter, wherein the control unit is configured to adjust a heater bias current based upon control parameters received from the monitor unit, and wherein adjusting the heater bias current shifts the wavelength corresponding to the first transmission peak.

In another embodiment, the disclosure includes an ONU comprising an optical port configured to receive an optical signal comprising a plurality of channels at different wavelengths from an OLT via an ODN, and an self-characterization optical receiver coupled to the optical port comprising a tunable filter comprising a first transmission peak and configured to receive the optical signal and output one channel at a wavelength corresponding to the first transmission peak, an OE converter coupled to the tunable filter configured to convert the one channel optical signal into an electrical signal, a monitor unit coupled to the OE and configured to adjust at least one control parameter based upon a power level of the electrical signal, and a control unit coupled to the monitor unit and the tunable filter, wherein the control unit is configured to adjust a heater bias current based upon control parameters received from the monitor unit, and wherein adjusting the heater bias current shifts the wavelength corresponding to the first transmission peak.

In another embodiment, the disclosure includes a method comprising receiving an optical signal comprising a plurality of channels at different wavelengths, filtering the optical signal to output one channel at a wavelength corresponding to a first transmission peak, converting the one channel optical signal into an electrical signal comprising a power level, monitoring the electrical signal power level, and varying at least one control parameter to maximize the electrical signal power level, wherein varying control parameters adjusts a heater bias current, and wherein adjusting a heater bias current shifts the wavelength corresponding to the first transmission peak.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
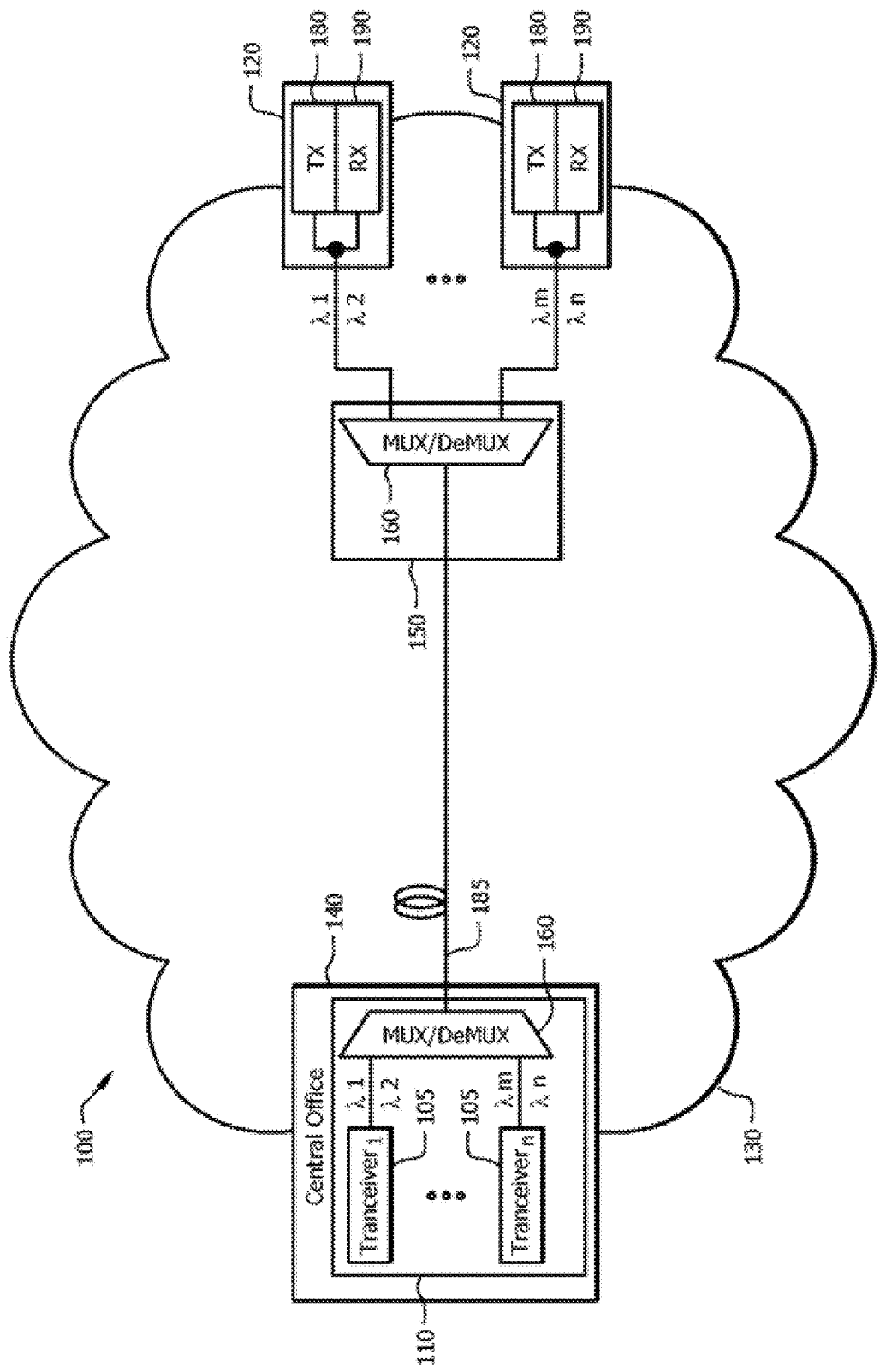
FIG. 1 is a schematic diagram of an embodiment of a TWDM PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or method for self-characterizing an optical receiver by adjusting a heater bias current based on the power level of a received signal in order to maximize the received power level. The disclosed optical receiver may comprise a monitoring unit configured to monitor the present power level of the received signal. The optical receiver may also comprise a control unit configured to adjust the heater bias current to shift a filter response curve based on at least one control parameter input from the monitoring unit. The monitoring unit may also store control parameters corresponding to specific wavelengths for future use. The optical receiver may automatically fine-tune the heater bias current if the power level of the received signal drops below a threshold value. Also, the optical receiver may adjust the filter response curve automatically to accommodate wavelength drifts in the received signal or in response to variations in the ambient temperature. The stored control parameters corresponding to specific wavelengths may be updated to reflect any adjustments made to the control parameters. An ONU comprising the disclosed optical receiver may automatically switch wavelength channels in response to an instruction received from an OLT.

In an embodiment, an ONU may couple to a TWDM PON and power on. The ONU may initialize a self-characterization procedure by sending a control message to its tunable optical receiver. The tunable optical receiver may receive the control message and scan tuner voltages. The tunable optical receiver may also forward tuner voltage data and average received signal power data to a memory and processor unit. The memory and processor unit may determine which tuner voltage data points correspond to maximum average received signal power data points. The memory and processor unit may also store these tuner voltage data points corresponding to maximum average received signal power data points. These stored data points may correspond to downstream wavelength channels. The ONU may use at least one of these stored data points to tune into a downstream wavelength channel. The ONU may also receive a control message from an OLT and register into the TWDM PON. During ONU operation, the saved values may be used to re-characterize the tunable ONU receiver's wavelength, which may have wandered due to environmental (e.g., temperature) changes. Average received optical power and ambient temperature values may be used for new heater bias current values for the tunable receiver wavelength setting. Furthermore, these values may be used to re-characterize the tunable ONU receiver to ensure substantially maximum power input for a particular channel or wavelength. The tunable ONU receiver may re-characterize itself once a day to several times a day without interrupting data reception. In an embodiment, the tunable ONU receiver may provide a self-characterization function and be characterized from a system level (i.e. self-aligned). Also, characterization values for the disclosed tunable self-characterization receiver may be stored for automatic switching between channels operating at different wavelengths. In another embodiment, the tunable ONU receiver may provide an automatic bias current adjustment function without a thermoelectric cooler (TEC) or similar device. The automatic bias current adjustment function may enable the tunable ONU receiver to fine-tune its heater bias current automatically to prevent filter transmission peak shifts resulting from variations in the ambient temperature. The tunable ONU receiver may also provide a received power monitoring and correction function enabling compensation for variations in a received channel wavelength due to a transmitter. Also, the tunable ONU receiver may provide an automatic channel switching function. The automatic channel switching function may permit a system level reallocation of downstream wavelengths to accommodate changes in data rate requirements (e.g. in a second phase Next Generation PON (NGPON2), a 40 gigabit PON (40 GPON) or an 80 gigabit PON (80 GPON)). In another embodiment, the tunable ONU receiver may automatically adjust an optical filter free spectral range (FSR) order seasonally to reduce power consumption. Although described with respect to an ONU, the systems and methods described herein may also be used in an OLT or other optical receiver.

FIG. 1 is a schematic diagram of an embodiment of a TWDM PON 100. PON 100 may comprise an OLT 110 located in a CO 140, one or more ONUs 120 located at the customer premises, and an optical distribution network (ODN) 130 that couples OLT 110 to ONU 120. PON 100 may provide WDM capability by associating a downstream wavelength and an upstream wavelength with each transceiver 105 in OLT 110 so that a plurality of wavelengths are present, combining those wavelengths into a single optical fiber cable 185, and distributing the plurality of wavelengths to a subset of ONUs 120 through one or more remote nodes (RN) 150. PON 100 may provide time division multiple access (TDMA) capability for each subset of ONUs 120 associated with an OLT 110. While a PON 100 is illustrated in FIG. 1, it will be appreciated that the optical components described herein can be used in any optical system or network.

PON 100 may be a communications network that does not require any active components to distribute data among OLT 110, RNs 150, and ONUs 120. Instead, PON 100 may use the passive optical components in ODN 130 to distribute data among OLTs 110, RN 150, and ONUs 120. PON 100 may be a Next Generation Access (NGA) system, such as a 10 Gb/s (gigabit per second) GPON (or gigabit PON) (e.g., XGPON), which may have a downstream bandwidth of about 10 Gb/s and an upstream bandwidth of about 2.5 Gb/s. Alternatively, PON 100 may be any Ethernet-based network, such as an EPON (or Ethernet passive optical network) defined by the Institute of Electrical and Electronics Engineers (IEEE) 802.3ah standard, a 10 Gb EPON as defined by the IEEE 802.3av standard, an asynchronous transfer mode PON (APON), a broadband PON (BPON) defined by the International Telecommunications Union (ITU) Telecommunications Standardization Sector (ITU-T) G.983 standard, a GPON defined by the ITU-T G.984 standard, a WDM PON (WPON), or a suitable after-arising technology, all of which are incorporated by reference as if reproduced in their entirety.

CO 140 may be a physical building and may comprise servers and other backbone equipment (not shown) designed to service a geographical area with data transfer capability. CO 140 may comprise a plurality of transceivers 105 and at least one multiplexer/demultiplexer (MUX/DeMUX) 160. MUX/DeMUX 160 may be any suitable wavelength separator/combiner such as an arrayed waveguide grating (AWG). MUX/DeMUX 160 at CO 140 may combine the various wavelengths from the transceivers 105 into a single line to feed into RN 150.

OLT 110 may be any device configured to communicate with ONUs 120 and another network (not shown). Specifically, OLT 110 may act as an intermediary between the other network and ONUs 120. For instance, OLT 110 may forward data received from the network to ONUs 120, and forward data received from ONUs 120 to the other network. Although the specific configuration of OLT 110 may vary depending on the type of PON 100, in an embodiment, OLT 110 may comprise a transmitter and a receiver. When the other network uses a network protocol, such as Ethernet or Synchronous Optical Networking/Synchronous Digital Hierarchy (SONET/SDH), which differs from the PON protocol used in PON 100, OLT 110 may comprise a converter that converts the network protocol into the PON protocol. OLT 110 converters may also convert the PON protocol into the network protocol. OLT 110 may be typically located at a central location, such as CO 140, but may be located at other locations as well.

ODN 130 may be a data distribution system, which may comprise optical fiber cables 185, couplers, splitters, distributors, and/or other equipment. In an embodiment, optical fiber cables 185, couplers, splitters, distributors, and/or other equipment may be passive optical components. Specifically, optical fiber cables 185, couplers, splitters, distributors, and/ or other equipment may be components that do not require any power to distribute data signals between OLTs 110 and ONUs 120. Alternatively, ODN 130 may comprise one or a plurality of active components, such as optical amplifiers and/or power splitters. ODN 130 may typically extend from OLTs 110 to ONUs 120 in a branching configuration as shown in FIG. 1, but may be alternatively configured in any other point-to-multipoint configuration.

RN 150 may be any component positioned within ODN 130 that provides partial reflectivity, polarization rotation, and/or WDM capability. For example, RN 150 may comprise a MUX/DeMUX 160. MUX/DeMUX 160 may be any suitable wavelength separator/combiner such as an AWG. RN 150 may exist closer to ONUs 120 than to CO 140, for example, at the end of a road where multiple users reside, but RN 150 may also exist at any point in ODN 130 between ONUs 120 and CO 140.

ONUs 120 may be any devices that are configured to communicate with OLT 110 and a customer or user (not shown). Specifically, ONUs 120 may act as an intermediary between OLT 110 and the customer. For instance, ONUs 120 may forward data received from OLT 110 to the customer and forward data received from the customer to OLT 110 via the RN 150. Although the specific configuration of ONUs 120 may vary depending on the type of PON 100, ONUs 120 may comprise an optical transmitter 180 (e.g. laser) configured to send optical signals to OLTs 110 and an optical receiver 190 configured to receive optical signals from the OLTs 110. In some embodiments, the transmitter 180 and receiver 190 may be combined into a transceiver. Additionally, ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. ONUs 120 may be typically located at distributed locations such as the customer premises, but may be located at other locations as well. In some embodiments, tunable lasers may be used in other optical telecommunication networks, as well.

Figure 2:
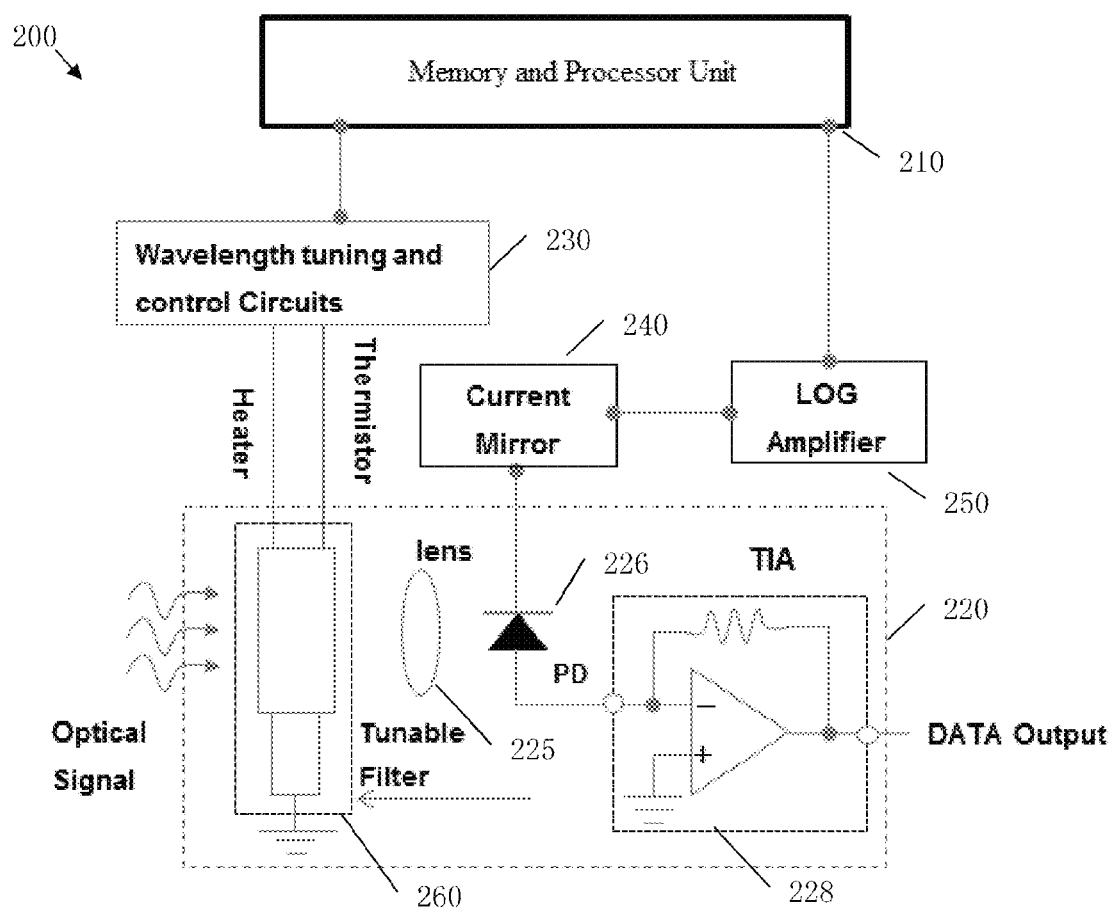
FIG. 2 is a schematic diagram of an embodiment of a tunable optical receiver.

FIG. 2 is a schematic diagram of an embodiment of a tunable optical receiver 200, which may be implemented in an ONU (e.g. ONU 120 of FIG. 1). Tunable optical receiver 200 may comprise a memory and processor unit 210, a receiver optical sub-assembly (ROSA) 220, a wavelength tuning and control circuit 230, a current mirror 240, and a logarithmic (LOG) amplifier 250. Memory and processor unit 210 may comprise a memory, a processor, an analog to digital converter (ADC), and a digital to analog converter (DAC). The processor in memory and processor unit 210 may be a single-core or multi-core microcontroller, a central processing unit (CPU), or a field-programmable gate array (FPGA). Memory and processor unit 210 may be used to measure, correlate, and store the various values (e.g., current versus wavelength) discussed herein. ROSA 220 may comprise a tunable filter 260, a lens 225, a photodiode detector (PD) 226, and a transimpedance amplifier (TIA) 228. For example, PD 226 may be a photodiode with an intrinsic region intervening between a n-doped region and a p-doped region (PiN photodiode) or an avalanche photodiode detector. Tunable filter 260 may receive a multi-wavelength optical channel transmitted in an ODN downstream direction (e.g. ODN 130 of FIG. 1) and output a single wavelength optical channel to lens 225. Memory and processor unit 210 may tune a filter transmission peak position of tunable filter 260 by adjusting a filter heating bias current via wavelength tuning and control circuit 230. Lens 225 may intervene between tunable filter 260 and PD 226, and may be configured to provide optical coupling of the single wavelength optical channel onto PD 226. PD 226 may be configured to receive the single wavelength optical channel and output a current flow proportional to the incident power of the single wavelength optical channel to TIA 228. TIA 228 may be configured to receive the current flow from PD 226 and output a data signal voltage corresponding to current flow input. Wavelength tuning and control circuit 230 may be coupled to memory and processor unit 210 and ROSA 220, and may provide heating current to ROSA 220 according to control inputs from memory and processor unit 210. Current mirror 240 may be coupled to PD 226 and LOG amp 250, and may provide bias voltage/current to PD 226 during operation. LOG amp 250 may be coupled to current mirror 240 and memory and processor unit 210, and may provide an output to memory and processor unit 210 corresponding to an average optical signal power received by PD 226.

Figure 3:
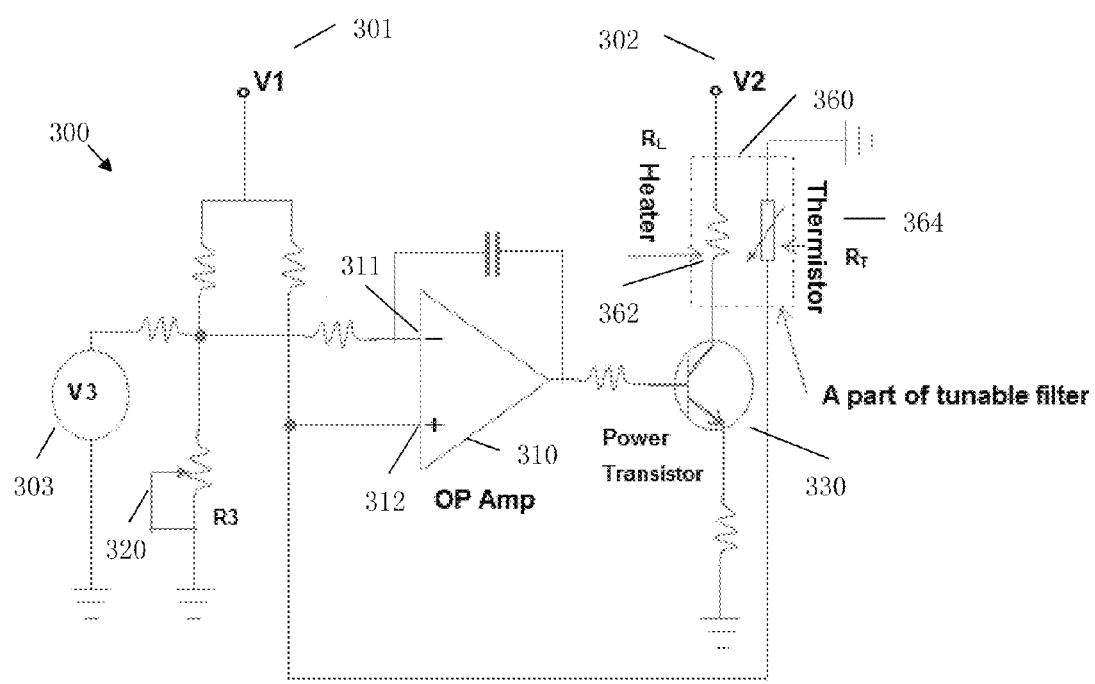
FIG. 3 is a schematic diagram of an embodiment of a wavelength tuning and control circuit.

FIG. 3 is a schematic diagram of an embodiment of a wavelength tuning and control circuit 300, which may be similar to wavelength tuning and control circuit 230 of FIG. 2. Wavelength tuning and control circuit 300 may comprise an operational amplifier (OP amp) 310, a variable resistance 320, and a power transistor 330. A memory and processor unit (e.g. memory and processor unit 210 of FIG. 2) may send wavelength tuning and control circuit 300 control voltages (e.g. first voltage 301, second voltage 302, and/or third voltage 303). Wavelength tuning and control circuit 300 may be configured to receive the control voltages, and in response adjust a filter transmission peak of a tunable filter 360 (e.g. tunable filter 260 of FIG. 2). Tunable filter 360 may comprise a heating element 362 and a thermistor 364 that the memory and processor unit may jointly and severally adjust by varying the control voltages. Heating element 362 may generate thermal energy for tunable filter 360 that may be proportional to the heater bias current flowing through power transistor 330. In wavelength tuning and control circuit 300, the heater bias current flowing through power transistor 330 may be directly adjusted by varying the second voltage 302. Also, the heater bias current flowing through power transistor 330 may be indirectly adjusted by using an output voltage of OP amp 310 to vary the forward bias of power transistor 330. The output voltage of OP amp 310 may be adjusted by varying the voltage present on an inverting input 311 and/or a non-inverting input 312. In an embodiment, the voltage present on the inverting input 311 of OP amp 310 may be varied using first voltage 301, third voltage 303, variable resistor 320, and/or a feedback control from the output. Variable resistor 320 may be adjusted accordingly to protect tunable filter 360 from overheating. In another embodiment, the voltage present on the non-inverting input 312 of OP amp 310 may be varied using first voltage 301 and/or thermistor 364. Thermistor 364 may be configured to provide a variable resistance that may proportionally increase or decrease based upon deviations in temperature.

Figure 4:
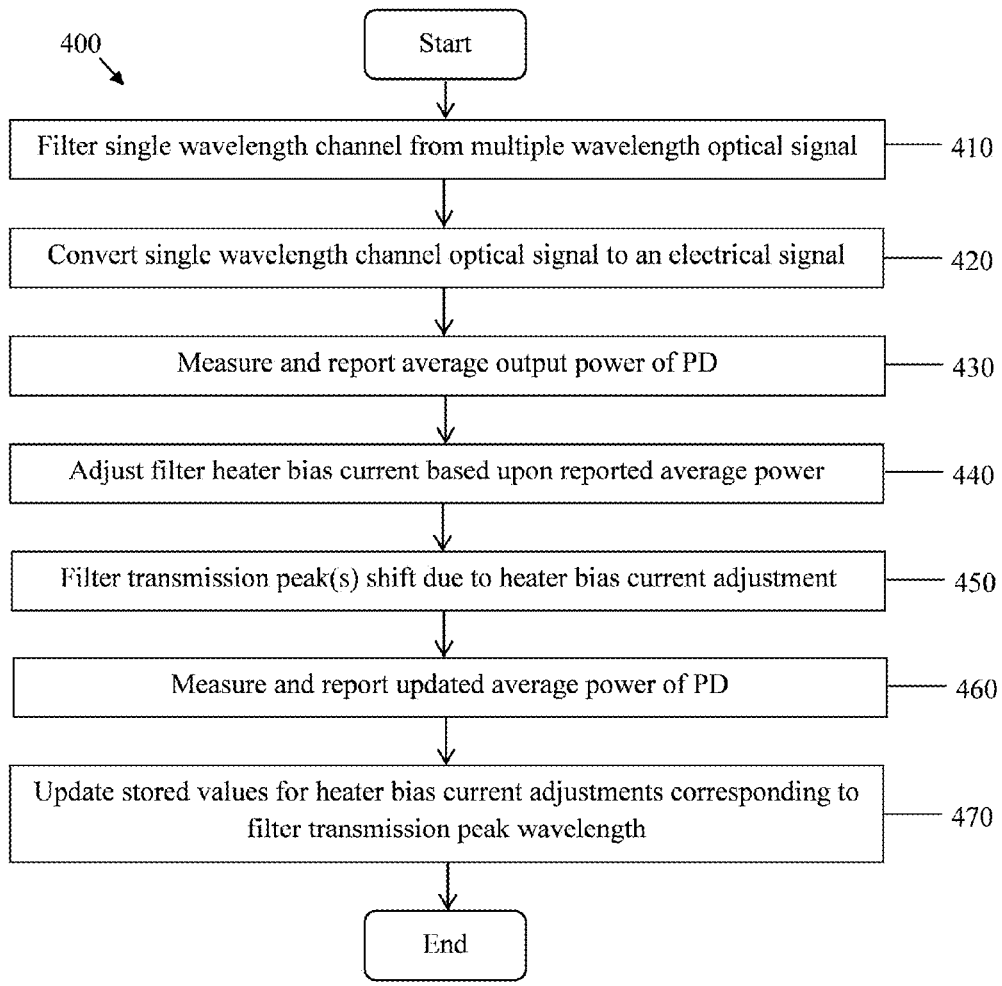
FIG. 4 is a flowchart illustrating an embodiment of a self-characterization method.

FIG. 4 is a flowchart illustrating an embodiment of a self-characterization method 400, which may be implemented by a tunable optical receiver (e.g. tunable optical receiver 200 of FIG. 2). In block 410, a multiple wavelength optical signal may pass through a filter with thermal wavelength tuning (e.g. tunable filter 260 of FIG. 2) comprising a first filter transmission peak. The filter may output a filtered optical signal comprising a single channel centered at a wavelength corresponding to the first transmission peak. In an embodiment, the filter may have a 3.6 nanometer (nm) free spectral range (FSR) at a wavelength of 1550 nm or 1600 nm. In block 420, the filtered optical signal may be received by a photodiode detector (e.g. PD 226 of FIG. 2) and converted into an electrical signal comprising an average power. In block 430, a current mirror and a LOG amplifier (e.g. current mirror 240 and LOG amplifier 250 of FIG. 2, respectively) may measure the average power received by the photodetector and output a received power value to a memory and processor unit (e.g. memory and processor unit 210 of FIG. 2) corresponding to the average power received by the photodetector. In block 440, the memory and processor unit may instruct a wavelength tuning and control circuit (e.g. wavelength tuning and control circuit 300 of FIG. 3) to shift the first filter transmission peak by adjusting a heater bias current for the filter. The wavelength tuning and control circuit may adjust the heater bias current in response to the instruction from the memory and processor unit. In an embodiment, the heater bias current may be adjusted by varying one or more control voltages/currents of the wavelength tuning and control circuit. In block 450, the first filter transmission peak may shift to a longer or shorter wavelength depending on whether the heater bias current was increased or decreased. In block 460, the LOG amplifier may output a value to the memory and processor unit corresponding to an updated average optical power received by the photodetector. In block 470, the memory and processor unit may store the heater bias current adjustment values corresponding to average received optical power value in its memory for filter transmission peak tuning, after which method 400 may end. The memory and processor unit may scan a wavelength range using method 400 by incrementing the heater bias current and recording the resulting average received optical power value with the values corresponding to the heater bias current adjustment.

Figure 5A:
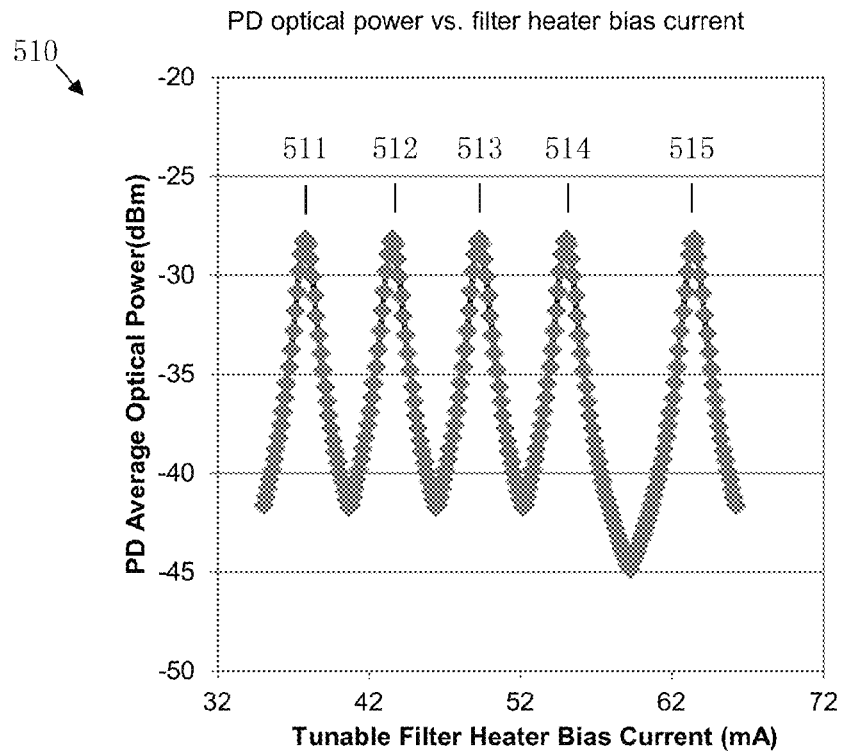
FIG. 5A is a graph of PD average output power versus tunable filter heater bias current for the tunable optical receiver shown in FIG. 2.
Figure 5B:
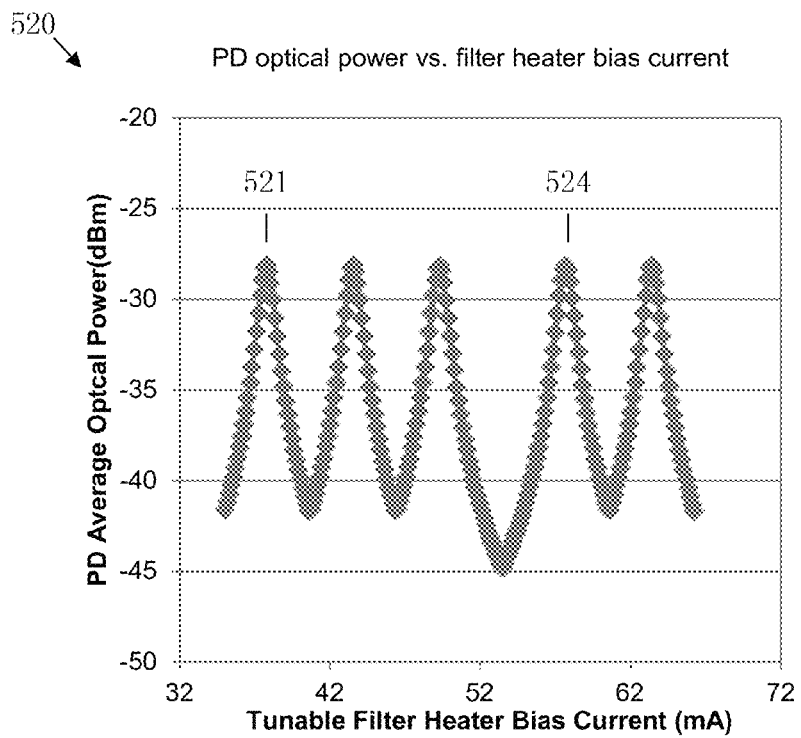
FIG. 5B is another graph of PD average output power versus tunable filter heater bias current for the tunable optical receiver shown in FIG. 2.

FIGS. 5A and 5B are graphs of PD average output power versus tunable filter heater bias current for the tunable optical receiver 200 shown in FIG. 2. In FIG. 5A, graph 510 shows the relationship between an output power at the PD with a 3.6 nm FSR tunable filter and the tunable filter heater bias current. Graph 510 shows how the self-characterization tunable optical receiver may identify the wavelength of an optical channel based on a corresponding tunable filter heater bias current. The peaks in graph 510 may correspond to wavelengths where memory and processor unit 210 may detect a maximum average output power at the PD. In an embodiment, a first peak 511 may correspond to a first channel of an optical signal, a second peak 512 may correspond to a second channel of the optical signal, and so on. A fifth peak 515 may correspond to a second cycle of the optical signal's first channel. The wavelength spacing between the fourth peak 514 and the fifth peak 515 may be approximately 1.5 times larger than the wavelength spacing between channels within a first FSR order (e.g. first peak 511, second peak 512, third peak 513, and fourth peak 514). In FIG. 5B, graph 520 shows similar relationships between an output power at the PD with a 3.6 nm FSR tunable filter and the tunable filter heater bias current as in graph 510. A difference between graph 510 and graph 520 is that the first peak 521 in graph 520 may correspond to a second channel of the optical signal. Also, a fourth peak 524 in graph 520 may correspond to a first channel of the optical signal within a second FSR order, similar to the fifth peak 515 in graph 510.

Figure 6:
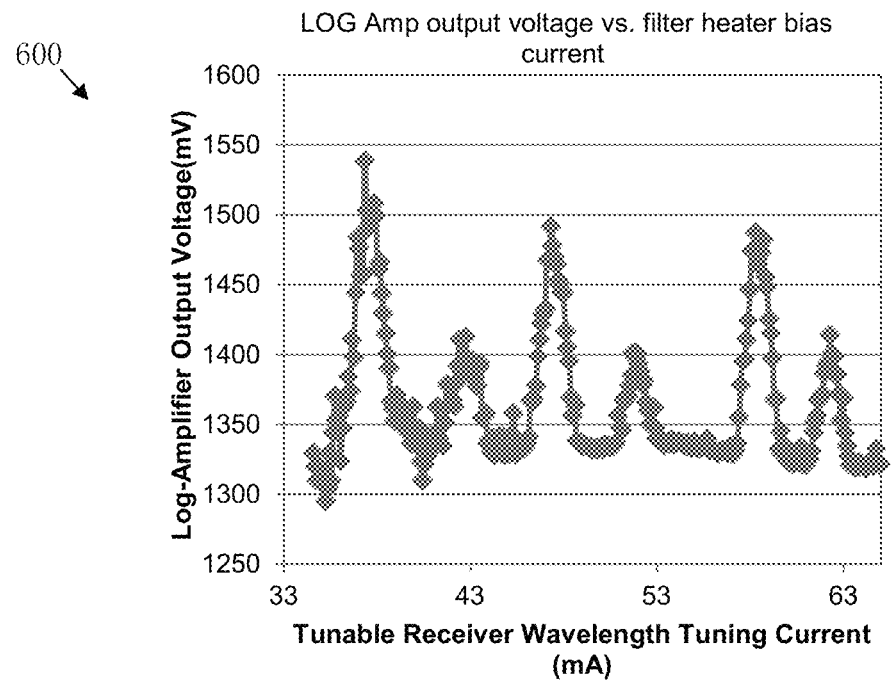
FIG. 6 is a graph of LOG amp output voltage reflecting a PD average output power versus tunable filter wavelength tuning current for the tunable optical receiver shown in FIG. 2.
Figure 7:
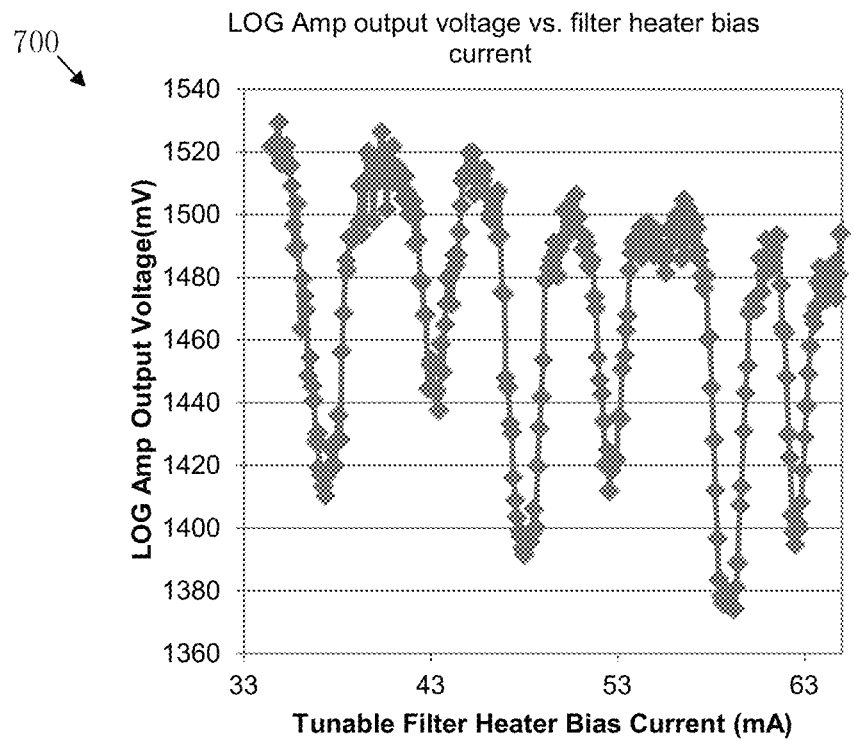
FIG. 7 is a graph of LOG amp output voltage reflecting a PD average output power versus tunable filter heater bias current for the tunable optical receiver shown in FIG. 2.
Figure 8:
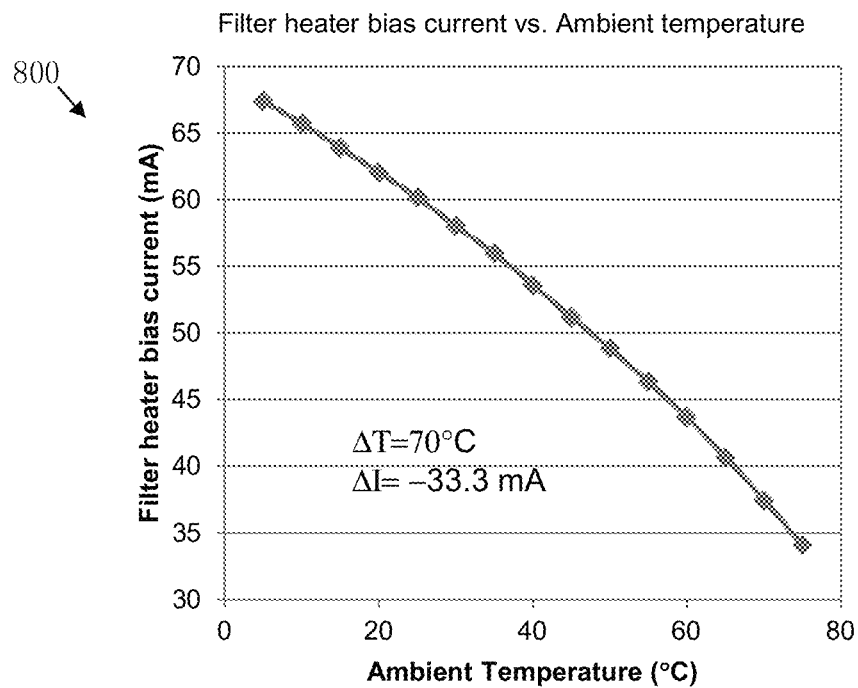
FIG. 8 is a graph of tunable filter heater bias current versus ambient temperature for the tunable optical receiver shown in FIG. 2.
Figure 9:
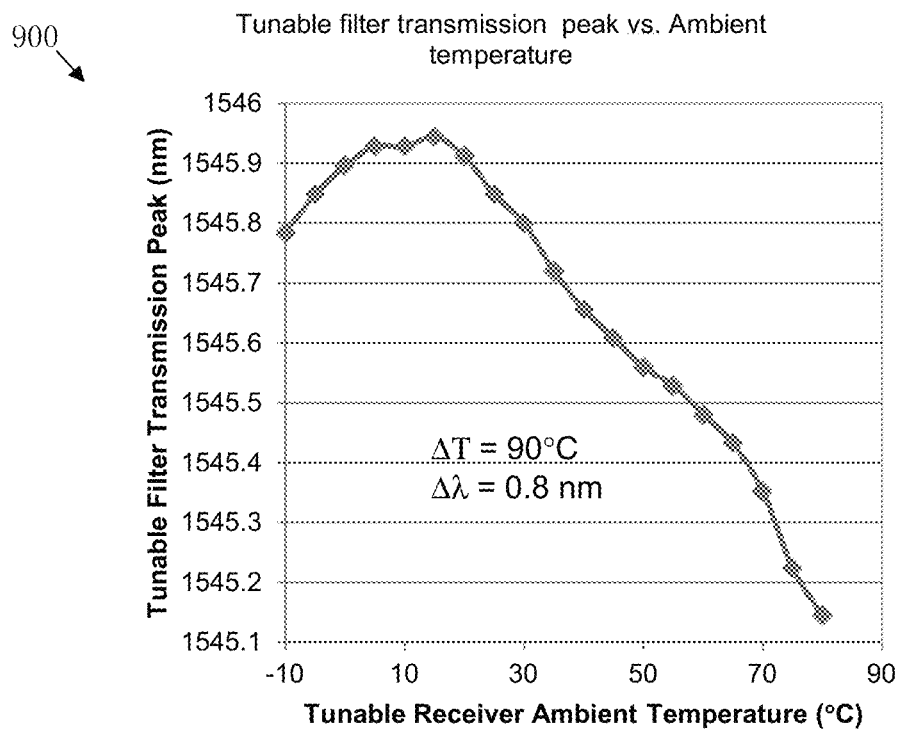
FIG. 9 is a graph of a tunable filter transmission peak versus ambient temperature for the tunable optical receiver shown in FIG. 2.

FIGS. 6-9 show experimental results for various parameters of the tunable optical receiver 200. FIG. 6 is a graph 600 of LOG amp output voltage reflecting a PD average output power versus tunable filter wavelength tuning current for the tunable optical receiver 200 shown in FIG. 2. FIG. 7 is a graph 700 of LOG amp output voltage reflecting a PD average output power versus tunable filter heater bias current for the tunable optical receiver 200 shown in FIG. 2. The minimums in graph 700 correspond to wavelengths where memory and processor unit 210 detect a maximum average output power at the PD. Therefore, both the tunable filter wavelength tuning current and the tunable filter heater bias current may be used to identify a downstream channel wavelength. FIG. 8 is a graph 800 of tunable filter heater bias current versus ambient temperature for the tunable optical receiver 200 shown in FIG. 2. FIG. 9 is a graph 900 of a tunable filter transmission peak versus ambient temperature for the tunable optical receiver 200 shown in FIG. 2. Tunable optical receiver 200 may store the wavelength tuning current, the filter heater bias current, and the control voltages for the wavelength tuning and control circuit control voltages (e.g. first voltage 301, second voltage 302, and/or third voltage 303) into the memory and processor unit 210 of tunable optical receiver 200. An analog to digital converter (ADC) (not shown) may be used for data saving and processing. The memory and processor unit 210 may find the maximum and minimum PD average output power values and save these values into a memory in the memory and processor unit 210.

Figure 10:
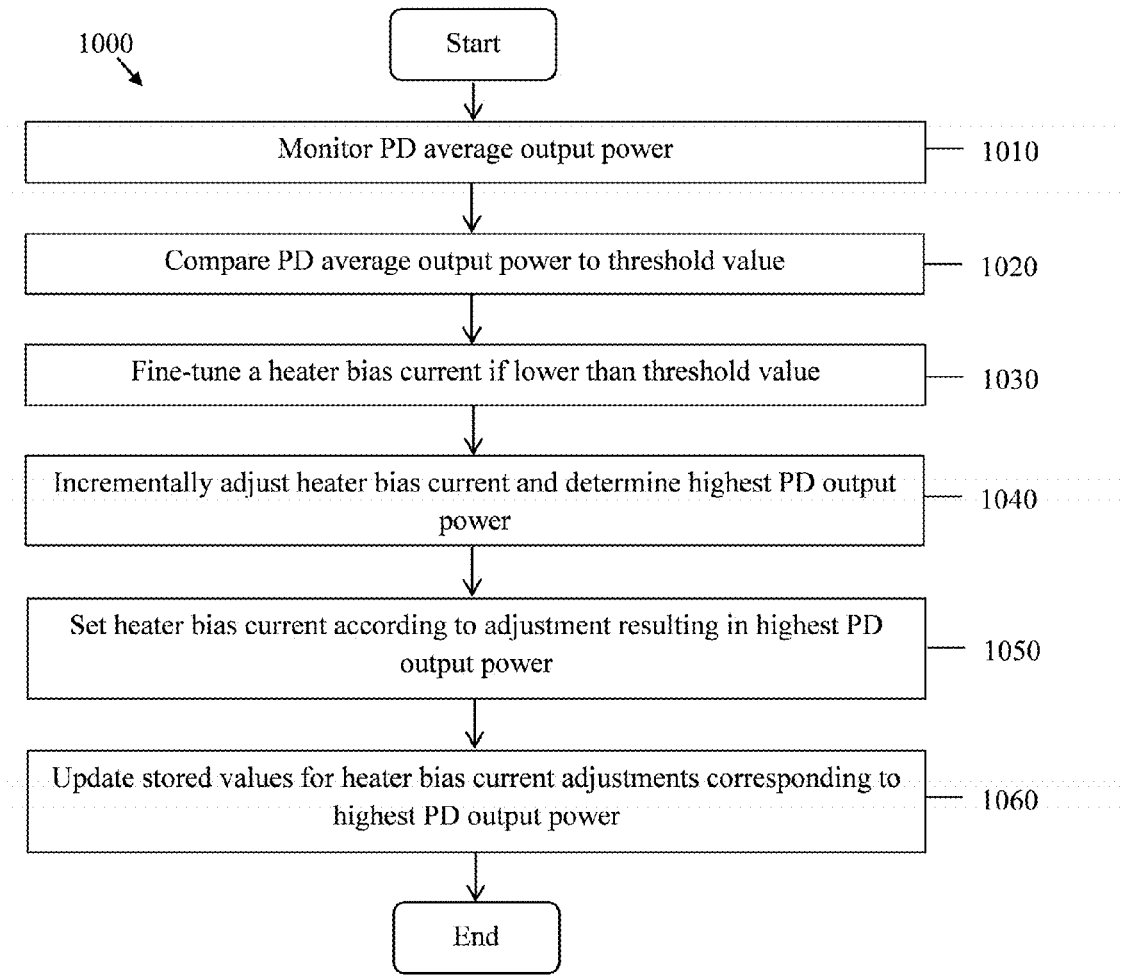
FIG. 10 is a flowchart illustrating an embodiment of a received power monitoring and correction method.

FIG. 10 is a flowchart illustrating an embodiment of a received power monitoring and correction method 1000. In block 1010, a memory and processor unit (e.g. memory and processor unit 210 of FIG. 2) may monitor PD average output power measurements from a LOG amp (e.g. LOG amp 250 of FIG. 2). In block 1020, the memory and processor unit may compare the PD average output power measurements to a threshold value. If the PD average output power measurement falls below the threshold value, the memory and processor unit may fine-tune a heater bias current in block 1030. The memory and processor unit may fine-tune the heater bias current by taking incremental power point measurements. The memory and processor unit may take power point measurements by varying one or more wavelength tuning and control circuit input voltages (e.g. first voltage 301, second voltage 302, and/or third voltage 303). The memory and processor unit may take a set number of power point measurements (e.g. three or five) and determine which power point reflects the highest PD average output power in block 1040. If a filter transmission peak drift to ambient temperature change is relatively low, (e.g. 0.1 nm filter transmission peak drift for every 10° C. change in ambient temperature) three point power measurements may be sufficient for method 1000. In block 1050, the memory and processor unit may change the wavelength tuning and control circuit input voltages to the combination that resulted in the highest power point measurement from block 1040. In block 1060, the memory and processor unit may replace the wavelength tuning and control circuit input voltages values stored in memory for the optical channel wavelength with the updated values.

Figure 11:
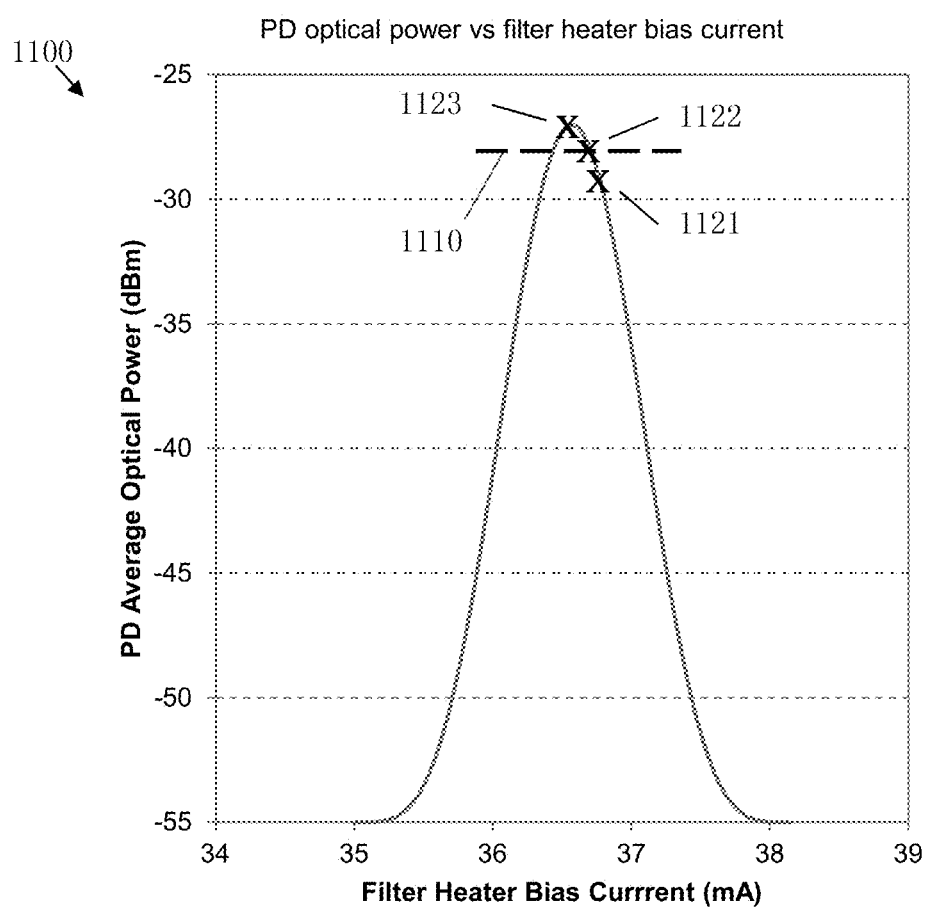
FIG. 11 is a graph of PD average output power versus tunable filter heater bias current for the tunable optical receiver shown in FIG. 2.

FIG. 11 is a graph 1100 of PD average output power versus tunable filter heater bias current for the tunable optical receiver embodiment. Graph 1100 shows an embodiment of three power point measurements for a received power monitoring and correction method (e.g. method 1000). A memory and processor unit may determine a PD average output power has fallen below a threshold value 1110 (e.g. −28 decibels per milliwatt (dBm)). The memory and processor unit may respond by taking three power point measurements through incrementally varying a filter heater bias current. The filter heater bias current may be varied by changing one or more wavelength tuning and control circuit input voltages and/or currents. A first incremental variation of the filter heater bias current may result in a first power point 1121, a second incremental variation may result in a second power point 1122, and a third incremental variation may result in a third power point 1123. In an embodiment, adjacent power point measurements may be less than or equal to 0.05 nm apart. The memory and processor unit may determine the third power point reflects the highest PD average output power. The heater bias current adjustment values resulting in the third power point may be sent to the wavelength tuning and control circuit as the current heater bias current adjustment values. The memory and processor control unit may also replace the wavelength tuning and control circuit input voltages values stored in its memory for the optical channel wavelength with the updated values.

Figure 12:
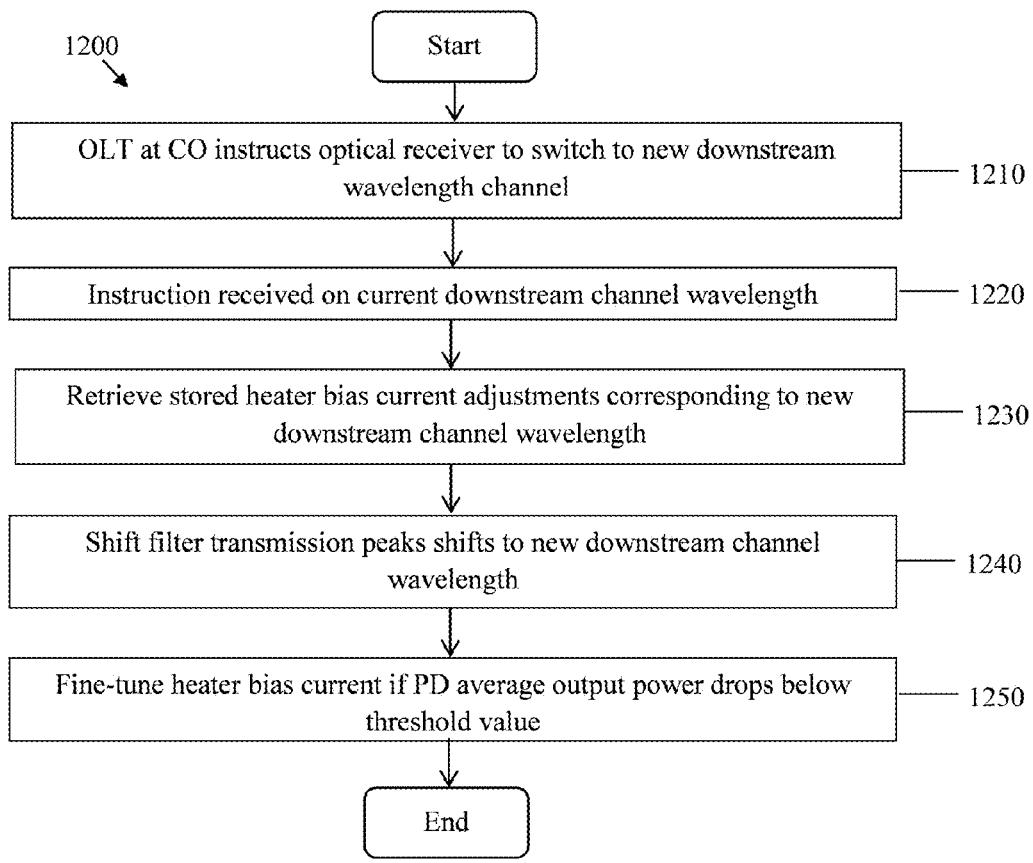
FIG. 12 is a flowchart illustrating an embodiment of an automatic channel switching method.

FIG. 12 is a flowchart illustrating an embodiment of an automatic channel switching method 1200. In block 1210, an OLT located at a CO may instruct a tunable optical receiver (e.g. tunable optical receiver 200 of FIG. 2) to switch to a downstream optical channel at a different wavelength to accommodate changing network demands. In block 1220, a memory and processor unit may receive the instruction on a current downstream optical channel. In block 1230, the memory and processor unit may retrieve one or more stored heater bias current adjustment values corresponding to the new downstream optical channel wavelength. In block 1240, the memory and processor unit may shift a tunable filter transmission peak to the new downstream optical channel wavelength by changing one or more wavelength tuning and control circuit input voltages using the stored heater bias current adjustment values. In block 1250, the memory and processor unit may optionally fine-tune a filter heater bias current if a PD average output power has fallen below a threshold value (e.g. using method 1000).

Figure 13A:
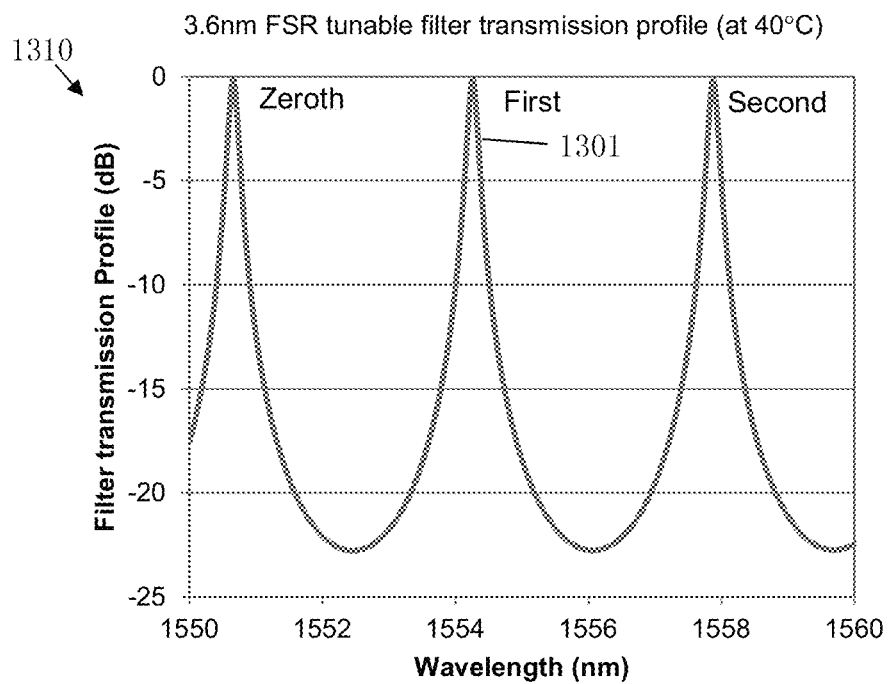
FIG. 13A is a graph of a tunable filter profile for the tunable optical receiver shown in FIG. 2 at 40 degrees Celsius (° C.).
Figure 13B:
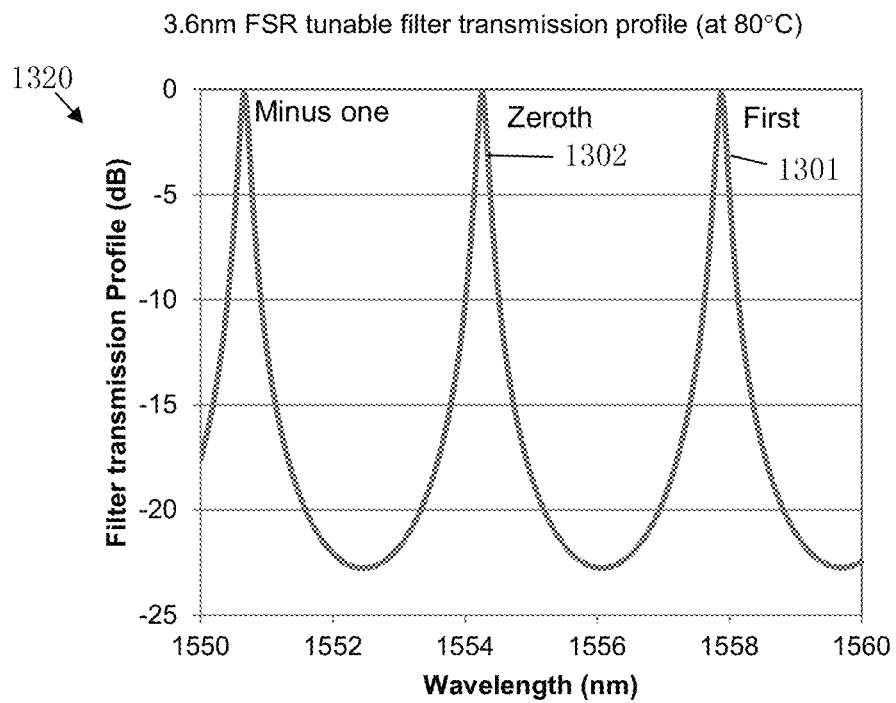
FIG. 13B is a graph of a tunable filter profile for the tunable optical receiver shown in FIG. 2 at 80° C.

FIGS. 13A and 13B are graphs of tunable filter profiles for the tunable optical receiver 200 shown in FIG. 2. In FIG. 13A, graph 1310 shows a 3.6 nm FSR tunable filter profile at 40° C. (e.g. during the winter). In FIG. 13B, graph 1320 shows the 3.6 nm FSR tunable filter profile at 80° C. (e.g. during the summer). Graphs 1310 and 1320 show how a tunable optical receiver may save power through an automatic seasonal transmission peak order adjustment. A filter response curve of the tunable filter may comprise a plurality of passbands with a corresponding filter transmission peak. Adjacent transmission peaks of the filter response curve may be spaced 3.6 nm apart. For example, a tuning rate of the tunable filter may be 0.09 nm for every 1° C. change in ambient temperature. Therefore, a first order transmission peak 1302 of the filter response curve may shift 3.6 nm for every 40° C. change in ambient temperature. In an embodiment, a tunable optical receiver operating at a 40° C. ambient temperature may be receiving an optical channel centered at a wavelength of 1554 nm during the winter using the first order transmission peak 1301, as shown in graph 1310. The same tunable optical receiver may take advantage of a 3.6 nm shift in the filter response curve when operating at an 80° C. ambient temperature during the summer to conserve energy. A memory and processor unit (e.g. memory and processor unit 210 of FIG. 2) may monitor the ambient temperature of the tunable optical receiver. In response to the 40° C. ambient temperature change, the memory and processor unit may switch from the first order transmission peak 1301 to the zeroth order transmission peak 1302 of the filter response curve. As a result, the tunable optical receiver may continue receiving the optical channel centered at a wavelength of 1554 nm while using a lower heater bias current. The memory and processor unit may optionally update the current heater bias current values in its memory.

Figure 14:
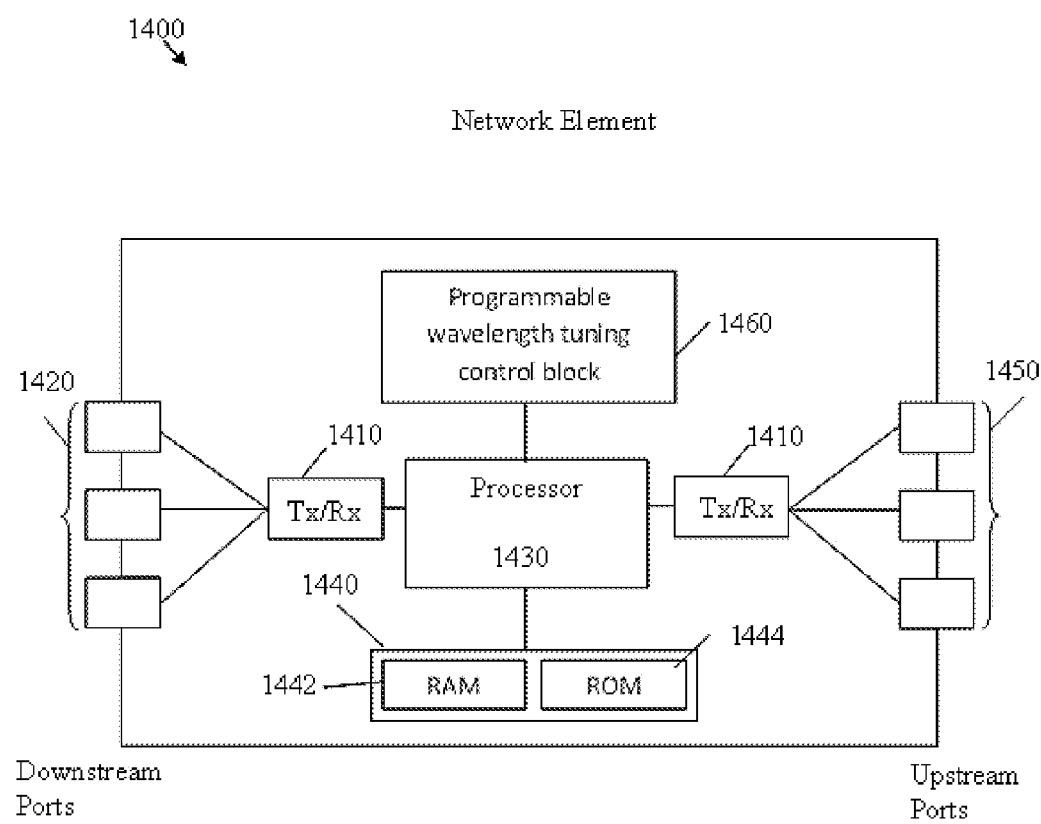
FIG. 14 is a schematic diagram of an embodiment of a network element.

At least some of the features/methods described in the disclosure may be implemented in a network element (NE). For instance, NE 1400 may correspond to or may be located at an ONU, such as ONUs 120 described above. FIG. 14 is a schematic diagram of an embodiment of a NE 1400, which may comprise memory and processor unit 210, tunable filter 360, and/or LOG amplifier 250. For instance, NE 1400 may be configured to shift a filter transmission peak by sending heater bias current adjustment values to a wavelength tuning and control circuit and/or to store the heater bias current adjustment values.

NE 1400 may comprise one or more ingress ports or faces coupled to a transceiver (Tx/Rx) 1410, which may be transmitters, receivers, or combinations thereof. A Tx/Rx 1410 may be coupled to plurality of downstream ports 1420 for transmitting and/or receiving signals from other nodes. A Tx/Rx 1410 may be coupled to a plurality of upstream ports 1450 for transmitting and/or receiving signals to other nodes. A processor 1430 may be coupled to the Tx/Rxs 1410 to process a PD average output power and/or determine the heater bias current adjustment values to send a wavelength tuning and control circuit. The processor 1430 may comprise one or more multi-core processors and/or memory modules 1440, which may function as data stores, buffers, etc. Processor 1430 may be implemented as a general processor or may be part of one or more application specific integrated circuits (ASICs) and/or digital signal processors (DSPs). The downstream ports 1420 and/or upstream ports 1450 may contain electrical and/or optical transmitting and/or receiving components. NE 1400 may also comprise a programmable wavelength tuning control block 1460. The programmable wavelength tuning control block 1460 may be configured to implement filter transmission peak shifting functions, such as determining values (e.g. control voltages and/or currents) corresponding to the heater bias current. Such heater bias current adjustment information may be maintained in a content table at the memory module 1440. The programmable wavelength tuning control block 1460 may then forward the updated heater bias current adjustment information to a wavelength tuning and control circuit (e.g. wavelength tuning and control circuit 300 of FIG. 3). The programmable wavelength tuning control block 1460 may be implemented using software, hardware, or both and may operate above the internet protocol (IP) layer or layer 2 (L2) in the OSI model. The memory module 1440 may comprise a cache 1442 for temporarily storing heater bias current adjustment information, e.g., a Random Access Memory (RAM). Additionally, the memory module 1440 may comprise a long-term storage 1444 for storing content relatively longer, e.g., a Read Only Memory (ROM). For instance, the cache 1442 and the long-term storage 1444 may include dynamic random-access memories (DRAMs), solid-state drives (SSDs), hard disks, or combinations thereof. Notably, the memory module 1440 may be used to house the instructions for carrying out the system and methods described herein.

It is understood that by programming and/or loading executable instructions onto NE 1500, at least one of the processors 1430, cache 1442, and long-term storage 1444 are changed, transforming NE 1400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A self-characterization optical receiver comprising:
    a tunable filter comprising a first transmission peak and configured to:
        receive a first optical signal comprising a plurality of wavelengths, wherein the plurality of wavelengths comprises a first wavelength corresponding to the first transmission peak; and
        output a second optical signal comprising only the first wavelength;
    an optical-to-electrical (OE) converter coupled to the tunable filter and configured to convert the second optical signal into an electrical signal;

a current mirror coupled to the OE converter and configured to provide a bias to the OE converter;

a memory and processor unit indirectly coupled to the OE converter and configured to generate a first instruction to adjust a control parameter based upon a power level of the electrical signal; and a wavelength tuning and control circuit coupled to the memory and processor unit and the tunable filter and configured to adjust a heater bias current to a first value based on the first instruction in order to shift the first transmission peak.

2. The self-characterization optical receiver of claim 1, wherein the memory and processor unit is further configured to store stored control parameters corresponding to specific wavelengths.

3. The self-characterization optical receiver of claim 2, wherein the memory and processor unit is further configured to compare the power level to a threshold value.

4. The self-characterization optical receiver of claim 3, wherein the memory and processor unit is further configured to generate the first instruction when the power level is less than the threshold value.

5. The self-characterization optical receiver of claim 4, wherein the memory and processor unit is further configured to generate additional instructions to adjust the control parameter a plurality of times to determine a maximum power level of the electrical signal.

6. The self-characterization optical receiver of claim 5, wherein the memory and processor unit is further configured to update the stored control parameters based upon the maximum power level.

7. The self-characterization optical receiver of claim 2, wherein the memory and processor unit is further configured to adjust the control parameter in response to a change in ambient temperature.

8. A self-characterization optical receiver comprising:
a tunable filter comprising a first transmission peak and configured to:
receive a first optical signal comprising a plurality of wavelengths, wherein the plurality of wavelengths comprises a first wavelength corresponding to the first transmission peak; and
output a second optical signal comprising only the first wavelength;
an optical-to-electrical (OE) converter coupled to the tunable filter and configured to convert the second optical signal into an electrical signal;
a memory and processor unit coupled to the OE converter and configured to generate a first instruction to adjust a control parameter based upon a power level of the electrical signal; and
a wavelength tuning and control circuit coupled to the memory and processor unit and the tunable filter and configured to adjust a heater bias current to a first value based on the first instruction in order to shift the first transmission peak,
wherein the memory and processor unit is further configured to store stored control parameters corresponding to specific wavelengths,
wherein the tunable filter further comprises a second transmission peak corresponding to a second wavelength and associated with a second value of the heater bias current, wherein the second value is lower than the first value,
wherein the second transmission peak is initially offset from the first transmission peak by a free spectral range (FSR),
wherein the second transmission peak drifts to the first wavelength due to a change in ambient temperature, and
wherein the tunable filter is further configured to use the second transmission peak after the drift in order to conserve power.

9. The self-characterization optical receiver of claim 8, wherein the FSR is about 3.6 nanometers (nm) when operating in a system with 4 downstream wavelengths with 100 gigahertz (GHz) channel spacing or about 6.8 nm when operating in a system with 8 downstream wavelengths with 100 GHz channel spacing.

10. The self-characterization optical receiver of claim 8, wherein the memory and processor unit is further configured to update the stored control parameters based upon the second transmission peak.

11. An optical network unit (ONU) comprising:
an optical port configured to receive from an optical line terminal (OLT) via an optical distribution network (ODN), a first optical signal comprising a plurality of wavelengths; and
a self-characterization optical receiver coupled to the optical port and comprising:
a tunable filter comprising a first transmission peak and configured to:
receive the first optical signal, wherein the plurality of wavelengths comprises a first wavelength corresponding to the first transmission peak; and
output a second optical signal comprising only the first wavelength;
an optical-to-electrical (OE) converter coupled to the tunable filter and configured to convert the second optical signal into an electrical signal;
a logarithmic (LOG) amplifier coupled to the OE converter;
a memory and processor unit indirectly coupled to the LOG amplifier such that the LOG amplifier is positioned between the OE converter and the memory and processor unit, wherein the memory and processor unit is configured to generate a first instruction to adjust a control parameter based upon a power level of the electrical signal; and
a wavelength tuning and control circuit coupled to the memory and processor unit and the tunable filter and configured to adjust a heater bias current to a first value based on the first instruction.

12. The ONU of claim 11, wherein the memory and processor unit is further configured to store stored control parameters corresponding to specific wavelengths.

13. The ONU of claim 12, wherein the memory and processor unit is further configured to:
detect automatically a shift in the first transmission peak;
generate the first instruction in response to the shift; and
update the stored control parameters based upon the first instruction.

14. The ONU of claim 12, wherein the memory and processor unit is further configured to:
receive from the OLT a second instruction directing the ONU to switch to a second transmission peak, and
adjust at least the control parameter in response to the second instruction.

15. The ONU of claim 12, wherein the tunable filter further comprises a filter rejection band, wherein the plurality of wavelengths is associated with a channel spacing that is larger than the filter rejection band.

16. The ONU of claim 11, wherein the wavelength tuning and control circuit is further configured to shift the first transmission peak without requiring a thermoelectric cooler.

17. A method comprising:
receiving a first optical signal comprising a plurality of wavelengths, wherein the plurality of wavelengths comprises a first wavelength corresponding to a first transmission peak;
filtering the first optical signal;
outputting a second optical signal comprising only the first wavelength;
converting, via an optical-to-electrical (OE) converter, the second optical signal into an electrical signal comprising a power level;
providing, via a current mirror coupled to the OE converter, a bias to the OE converter;
monitoring the power level; and
adjusting a heater bias current to maximize the power level and shift the first transmission peak.

18. The method of claim 17, further comprising storing stored control parameters corresponding to specific wavelengths.

19. The method of claim 18, further comprising varying the heater bias current in response to an ambient temperature change.

20. The method of claim 18, further comprising:
comparing the power level to a threshold level; and
varying at least one control parameter when the power level is less than the threshold level.

21. The self-characterization optical receiver of claim 1, wherein the OE converter is a photodiode (PD).

22. The self-characterization optical receiver of claim 1, further comprising a logarithmic (LOG) amplifier coupled to the current mirror.

23. The ONU of claim 11, wherein the self-characterization optical receiver further comprises a current mirror coupled to the OE converter.

24. The method of claim 17, further comprising providing, via a logarithmic (LOG) amplifier coupled to the OE converter, an average optical signal power.

25. The method of claim 18, further comprising adjusting a free spectral range (FSR) of a filter in response to a change of a season of a year.

* * * * *